United States Patent
Farrell et al.

(10) Patent No.: US 7,197,585 B2
(45) Date of Patent: Mar. 27, 2007

(54) METHOD AND APPARATUS FOR MANAGING THE EXECUTION OF A BROADCAST INSTRUCTION ON A GUEST PROCESSOR

(75) Inventors: Mark S. Farrell, Pleasant Valley, NY (US); Charles W. Gainey, Poughkeepsie, NY (US); Jeffrey P. Kubala, Poughquag, NY (US); Damian L. Osisek, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 10/262,311

(22) Filed: Sep. 30, 2002

(65) Prior Publication Data

US 2004/0064618 A1 Apr. 1, 2004

(51) Int. Cl.
*G06F 12/00* (2006.01)

(52) U.S. Cl. .................. 710/200; 710/108; 709/210

(58) Field of Classification Search ................ 710/200, 710/107–109; 709/208–211; 711/203–210; 712/28–31, 237–241
See application file for complete search history.

(56) References Cited

U.S. PATENT DOCUMENTS

| | | | |
|---|---|---|---|
| 5,261,106 A | 11/1993 | Lentz et al. | 395/725 |
| 5,293,600 A | 3/1994 | Vriezen | 395/425 |
| 5,442,763 A | 8/1995 | Bartfai et al. | 395/375 |

(Continued)

FOREIGN PATENT DOCUMENTS

EP 0 438 958 A2 12/1990

OTHER PUBLICATIONS

A. El Abbadi, Performance Characteristics of Protocols With Ordered Shared Locks, 1991, pp. 592–601, CH2968–6/0000/0592.

K.S. Ho, A Collaborative Word Processing System Using a COBRA–Based Workflow Framework, 2001, pp. 176–185, 0–7695–1300–X.

(Continued)

*Primary Examiner*—Paul R. Myers
*Assistant Examiner*—Raymond N Phan
(74) *Attorney, Agent, or Firm*—William A. Kinnaman, Jr.

(57) ABSTRACT

A method and apparatus for managing the execution on guest processors of a broadcast instruction requiring a corresponding operation on other processors of a guest machine. Each of a plurality of processors on an information handling system is operable either as a host processor under the control of a host program executing on a host machine or as a guest processor under the control of a guest program executing on a guest machine. The guest machine is defined by the host program executing on the host machine and contains a plurality of such guest processors forming a guest multiprocessing configuration. A lock is defined for the guest machine containing an indication of whether it is being held by a host lock holder from the host program and a count of the number of processors holding the lock as guest lock holders. Upon decoding a broadcast instruction executing on a processor operating as a guest processor, the lock is tested to determine whether it is being held by a host lock holder. If the lock is being held by a host lock holder, an instruction interception is recognized and execution of the instruction is terminated. If the lock is not being held by a host lock holder, the lock is updated to indicate that it is being held by the guest processor as a shared lock holder, the instruction is executed, and then the lock is updated a second time to indicate that it is no longer being held by the guest processor as a shared lock holder.

24 Claims, 5 Drawing Sheets

U.S. PATENT DOCUMENTS

| | | | | |
|---|---|---|---|---|
| 5,613,086 A | * | 3/1997 | Frey et al. | 711/152 |
| 5,737,611 A | | 4/1998 | Vicik | 395/726 |
| 6,079,013 A | * | 6/2000 | Webb et al. | 712/227 |
| 6,185,650 B1 | | 2/2001 | Boonie et al. | 710/200 |
| 6,189,007 B1 | | 2/2001 | Boonie et al. | 707/8 |
| 6,199,094 B1 | | 3/2001 | Presler-Marshall | 709/104 |
| 6,253,274 B1 | | 6/2001 | Boonie et al. | 710/200 |
| 6,615,340 B1 | * | 9/2003 | Wilmot, II | 712/209 |
| 6,684,305 B1 | * | 1/2004 | Deneau | 711/159 |

OTHER PUBLICATIONS

A. Thomasian, A Performance Comparison of Locking Methods with Limited Wait Depth, vol. 9, No. 3, May/Jun. 1997, pp. 421–434, 1041–4347.

T.E. Anderson, The Performance of Spin Lock Alternatives for Shared–Memory Multiprocessors, vol. 1, No. 1, Jan. 1990, pp. 6–16, 1045–9219/90/0100–0006.

G. Hermannsson, Optimistic Synchronization in Distributed Shared Memory, 1994, pp. 345–354, 1063–6927.

R.K. Abbott, "Scheduling Real–Time Transactions: A Performance Evaluation" ACM Transactions on Database Systems, vol. 17, No. 3, Sep. 1992, pp. 513–560, ACM 0362–5915/92/0900–0513.

B. Ciciani, IBM Technical Disclosure Bulletin: Balanced Control Protocol for Hybrid Database System, vol. 31, No. 10, Mar. 1989, pp. 263–264.

* cited by examiner

METHOD AND APPARATUS FOR MANAGING THE EXECUTION OF A BROADCAST INSTRUCTION ON A GUEST PROCESSOR

BACKGROUND OF THE INVENTION

1. Field of the Invention

This invention relates to a method and apparatus for controlling the execution of a broadcast instruction on a guest processor of a guest multiprocessing configuration. More particularly, it relates to a method and apparatus for controlling the execution, on a guest processor operating in interpretive execution mode, of an instruction for invalidating table entries of a dynamic address translation (DAT) system or for purging contents of buffers used for address translation. The invention also relates more generally to a method and apparatus for managing a lock.

2. Description of the Related Art

This invention relates to the execution on guest processors of instructions relating to dynamic address translation. A brief discussion of the concepts of dynamic address translation and virtual or guest machines as they relate to the present invention follows.

Dynamic address translation is a well-known mechanism for converting a virtual memory address used by a program to reference data to a real memory address at which the data is actually stored. Dynamic address translation allows a program to have a virtual address space larger than the real address space, since much of the virtual address space can be mapped to virtual storage (i.e., a peripheral device such as a disk) rather than real addressable memory. Pages can be moved from virtual storage to real storage on an as-needed basis. Dynamic address translation is performed by a central processing unit (CPU) (the terms "CPU" and "processor" are used generally interchangeably herein) in a manner that is generally transparent to the program, which does not have to concern itself with the details of the translation. Dynamic address translation as performed in computers conforming to Enterprise Systems Architecture/390 (ESA/390), a 31-bit architecture, is described at pages 3-26 to 3-40 of the IBM publication *IBM Enterprise Systems Architecture/390 Principles of Operation*, SA22-7201-07 (July 2001), while dynamic address translation as performed in computers conforming to the z/Architecture, a 64-bit architecture, is described at pages 3-26 to 3-47 of the IBM publication *IBM z/Architecture Principles of Operation*, SA22-7832-01 (October 2001), both of which publications are incorporated herein by reference.

A processor performing dynamic address translation uses various tables to keep track of the mapping between virtual and real memory addresses. Of particular interest here are the page tables, which contain entries corresponding to "pages" (4,096-byte blocks in the referenced architectures) of virtual memory. In the architectures referenced above, each page table entry contains either a pointer to a real memory location at which the page is located or an indicator that the data is "paged out" to virtual storage and that the entry is therefore invalid.

In addition to DAT tables such as the page tables just described, processors use so-called translation lookaside buffers (TLBs) to store the corresponding real storage locations of the most recently accessed virtual pages. Since most consecutive memory references are to the same or a recently used page of virtual memory, the use of TLBs further speeds up the translation process by avoiding the overhead of retranslation.

When a page of virtual memory is paged out from a real memory to virtual storage, the corresponding page table and TLB entries must be invalidated so that incorrect memory accesses will not occur. In both the ESA/390 architecture and the z/Architecture referenced above, an Invalidate Page Table Entry (IPTE) machine instruction is used to invalidate such page table and TLB entries. More particularly, as described in the ESA/390 publication at pages 10-26 to 10-27 and in the z/Architecture publication at pages 10-29 to 10-30, execution of an IPTE instruction entails invalidating the designated page table entry and clearing or purging the translation lookaside buffers (TLBs) of all CPUs in the configuration of the associated entries. Although most of the discussion herein will center on the IPTE instruction, additional instructions that require the purging of buffer entries in other CPUs of the configuration include the Compare and Swap and Purge (CSP) instruction of both referenced architectures. Collectively, these will be referred to herein as broadcast instructions, since they are typically broadcast to other CPUs.

We turn now to the other background principle underlying this invention. As described in the IBM publication *IBM System/370 Extended Architecture Interpretive Execution*, SA22-7095-1 (September 1985), incorporated herein by reference, a host machine and host program executing on the host machine may be operated in such a manner as to create one or more virtual or guest machines on which guest programs execute. From the standpoint of a guest program executing on a guest machine, the virtual machine appears to be a real machine. Guest machines of this type, supported directly by the host machine and host program, are referred to as level 1 guests, with the host being level 0. In a similar manner, each such level 1 guest machine, in conjunction with a suitable level 1 guest program running on it, may support one or more level 2 guest machines with corresponding level 2 guest programs. Host programs capable of creating virtual machines of this type include the IBM VM/ESA and z/VM operating systems, as well as the Processor Resource/Systems Manager (PR/SM) feature of the IBM eServer S/390 G5 and G6 and zSeries 800 (z800) and zSeries 900 (z900) servers. While VM/ESA and z/VM are packaged as separate programs whereas PR/SM is packaged as a machine feature, they function similarly insofar as the present invention is concerned. In the case of PR/SM, the virtual machines are generally referred to as logical partitions (LPs), while the host program is referred to as the logical partition manager.

A host machine may be either a uniprocessor machine containing a single real CPU or a multiprocessor (MP) machine containing multiple real CPUs. To support a virtual machine of the type described above, each host processor of a host machine is operable in a so-called interpretive execution mode in which it executes instructions of a guest program running on a guest machine. Each processor operating in such a fashion constitutes a virtual or guest processor of the guest machine. Each guest machine, like the host machine, may be either a uniprocessing (UP) configuration containing only a single guest CPU or a multiprocessing (MP) configuration containing plural guest CPUs.

Among the instructions of the guest program executed by a guest processor are broadcast instructions of the type described above. This is described, for example, in U.S. Pat. No. 4,779,188 (Gum et al.), entitled "Selective Guest System Purge Control"; U.S. Pat. No. 4,456,954 (Bullions et al.), entitled "Virtual Machine System with Guest Architecture Emulation Using Hardware TLB's for Plural Level Address Translations"; and U.S. Pat. No. 5,317,705

(Gannon et al.), entitled "Apparatus and Method for TLB Purge Reduction in a Multi-Level Machine System", all of which are incorporated herein by reference. Certain performance problems are encountered, however, when broadcast instructions are executed by a guest processor of a guest MP configuration. In systems of the type described above, what is known as an IPTE lock is conventionally used to serialize the actions of guest processors of a particular guest machine when executing broadcast instructions. The nature of the IPTE lock is such that it can be held either by a single guest processor of the guest machine on an exclusive basis or by one or more host processors (on a basis defined by the host program). The IPTE lock is implemented by a lock bit that is set to one to indicate that it has been acquired, either by a guest processor or by one or more host requesters, and a count of the number of host requesters holding the lock on a shared basis. The problem arises when multiple guest processors of a particular guest machine encounter IPTE or other broadcast instructions in close time sequence, as they often do. The first guest processor to encounter such an instruction may acquire the lock, but the others will fail in their lock attempts, resulting in what is known as an instruction interception taking them out of interpretive execution mode. As a consequence, the broadcast instructions that would have been executed by the guest processors must now be executed by the host processors operating in instruction simulation mode. This is very expensive in terms of use of computer resources.

SUMMARY OF THE INVENTION

The present invention permits multiple CPUs operating in the interpretive execution mode to remain in that mode while handling IPTE or other broadcast instructions. This is accomplished by redefining the IPTE lock from a single-guest-CPU lock to a shared, multiple-guest-CPU lock that does not cause instruction interception of IPTE or other broadcast instructions to be recognized when the IPTE lock is already held by one or more other CPUs of the guest configuration.

More particularly, the present invention contemplates a method and apparatus for managing the execution on guest processors of a broadcast instruction requiring a corresponding operation on other processors of a guest machine. The setting for the invention is an information handling system in which each of a plurality of processors is operable at any time either as a host processor under the control of a host program executing on a host machine or as a guest processor under the control of a guest program executing on a guest machine. The guest machine is defined by the host program executing on the host machine and contains a plurality of such guest processors forming a guest multiprocessing configuration.

In accordance with the invention, a lock is defined for the guest machine containing an indication of whether it is being held by a host lock holder from the host program and a count of the number of processors holding the lock as guest lock holders. Upon decoding a broadcast instruction executing on a processor operating as a guest processor, the lock is tested to determine whether it is being held by a host lock holder. If the lock is being held by a host lock holder, an instruction interception is recognized and execution of the instruction is terminated. If the lock is not being held by a host lock holder, the lock is updated to indicate that it is being held by the guest processor as a shared lock holder, the instruction is executed, and then the lock is updated a second time to indicate that it is no longer being held by the guest processor as a shared lock holder.

Preferably, the lock contains an indicator, a host count and a guest count. The indicator is set to a first value (0) to indicate that it is not being held by either a host lock holder or a guest lock holder and is set to a second value (1) to indicate that it is being held by at least one host lock holder or at least one guest lock holder. The host count indicates the number of host lock holders holding the lock on a shared basis. The host count is set to zero to indicate that it is not being held by a host lock holder and is set to a nonzero value (preferably, to the number of host lock holders) to indicate that it is being held by at least one host lock holder. Finally, the guest count indicates the number of processors holding the lock as guest lock holders on a shared basis. The lock thus defined is exclusive as between host lock holders as a group and guest lock holders as a group. It can, however, be held by multiple lock holders so long as they are all in one of the groups. Such a lock (possibly with counts for more than two competing groups of lock holders) may have uses outside of the guest-host processor application described herein.

The purpose of the single-guest-CPU lock of the prior art was to serialize processing being performed by the guest CPU itself or by the host program as it emulated the guest function. Thus, these are the two parties that must serialize against each other. The changed definition defines two use counts (the host count and the guest count) by which one of the two contending parties can hold the lock simultaneously on multiple CPUs in a manner that allows either party to acquire the lock only when it is in the unlocked state. Beyond that, each party manages its own internal sharing as it sees fit.

The invention resides in the host machine and may be implemented by any suitable means, including hardware, microcode, or even programming (as where the host machine itself is being emulated by programming executing on another host platform).

DESCRIPTION OF THE PREFERRED EMBODIMENT

Figure 1:
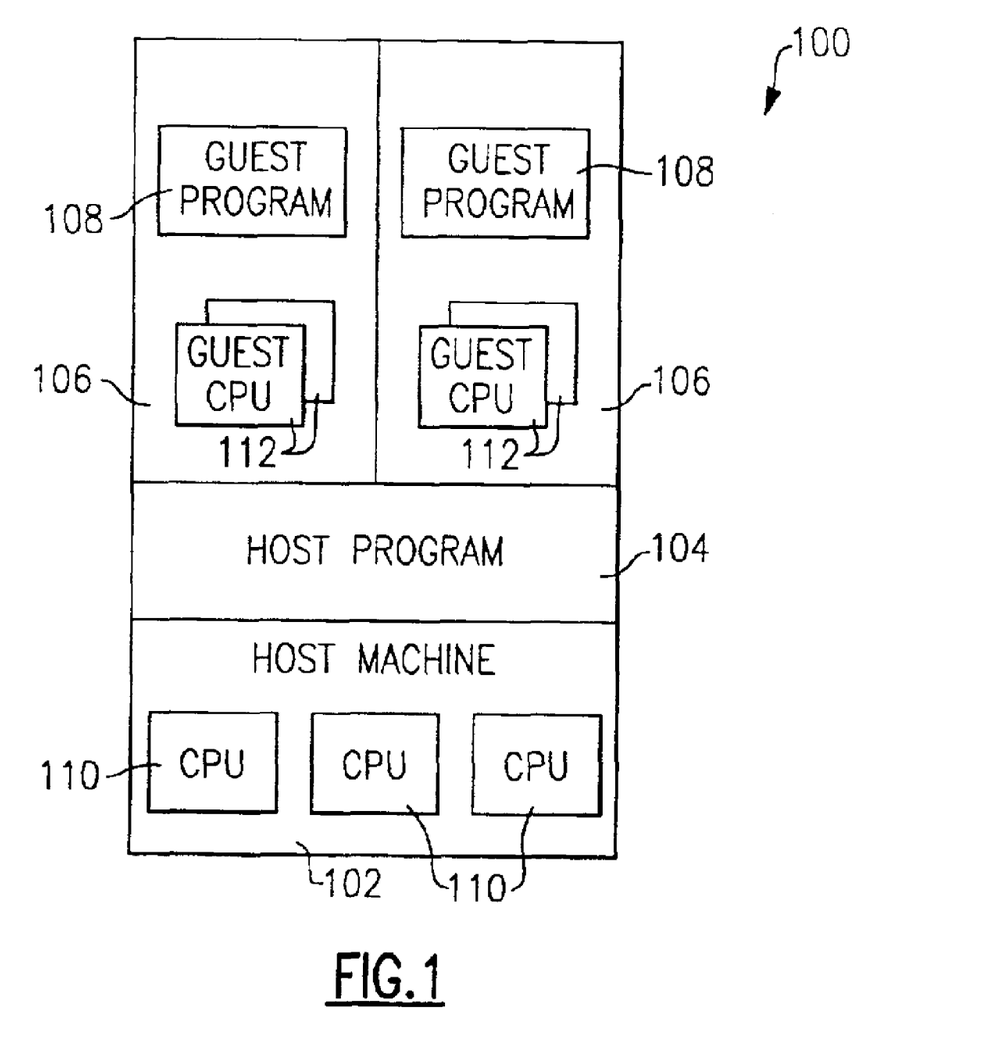
FIG. 1 shows a computer system incorporating the present invention.

FIG. 1 shows a computer system 100 incorporating the present invention. Computer system 100 comprises a host machine 102 having a host program 104 executing thereon. Together the host machine 102 and the host program 104 define one or more virtual or guest machines 106, each of which has a guest program 108 executing thereon. As described above, host machine 102 may be an IBM eServer S/390 or zSeries server, while host program 104 may be an IBM VM/ESA or z/VM operating system, or the Processor Resource/Systems Manager (PR/SM) feature of an IBM eSeries S/390 or zSeries server. Where PR/SM is used for the host program 104, the guest machines 106 created are generally referred to a logical partitions, but the term "guest machine" or "virtual machine" will generally be used herein for the sake of uniformity. Each guest program 108, which may be the same or different for each guest machine 106, may be any suitable operating system such as OS/390, z/OS, Linux or the like.

Host machine 102 has a plurality of real central processing units (CPUs) 110, an exemplary number of which are shown in FIG. 1. Each guest machine 106 may have a plurality of virtual or guest CPUs 112, which are not separate physical elements from the real CPUs 110, but rather are created on a virtual basis by having the host program execute a Start Interpretive Execution (SIE) instruction on the target CPU 110. Execution of the SIE instruction on the target CPU 110 causes the CPU to enter what is known as an "interpretive execution" mode in which it performs the functions of the interpreted guest machine 106, executing instructions of the guest program 108. A CPU 110 operating in the interpretive execution mode remains in such mode until either interception or a host interruption occurs. Interception is recognized if conditions are encountered in the guest that cannot be handled in the interpretive execution mode (such as when the IPTE lock to be described cannot be acquired) or for which special assistance is supplied by the host program.

Figure 2:
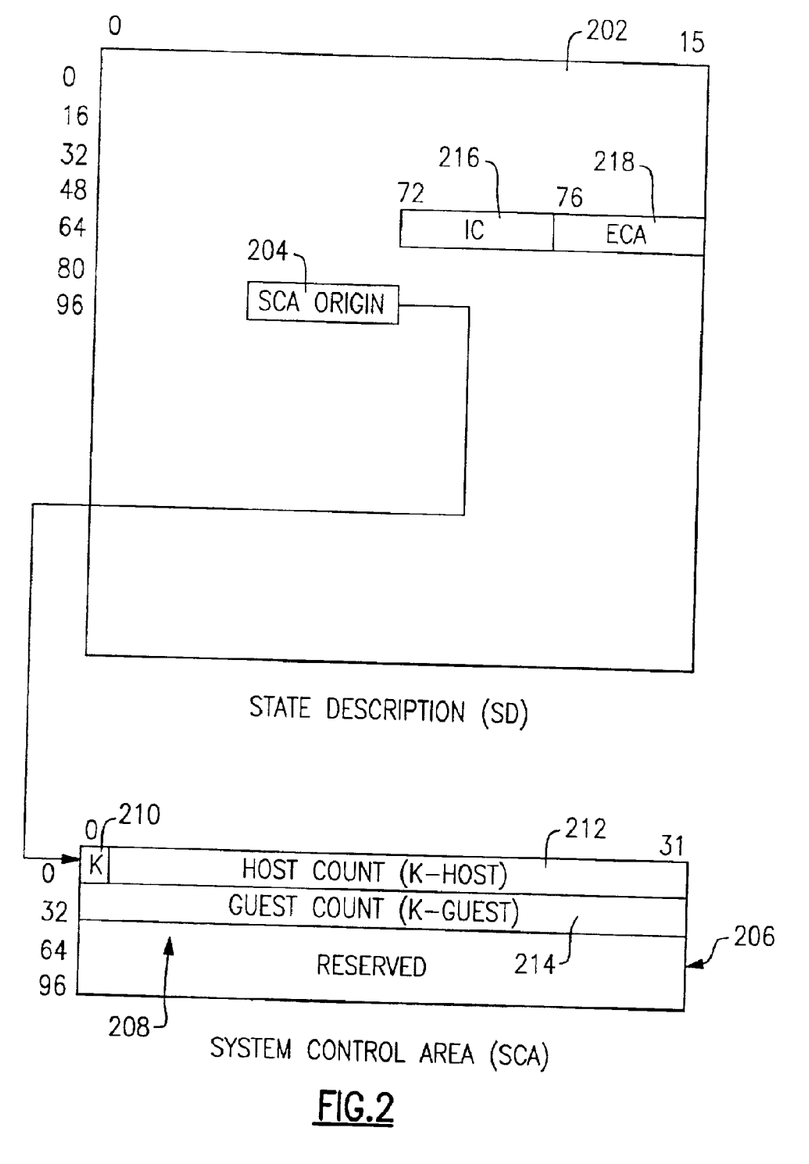
FIG. 2 shows the data structures of the system shown in FIG. 1 that are involved in the operation of the present invention.

FIG. 2 shows some of the data structures associated with the guest processors 112 of a guest configuration 106. Associated with each guest processor 112 is a state description (SD) 202. State description 202 contains various types of data relating to the execution state of the guest processor 112, including the program status word (PSW), register contents and the like. State description 202 is generally described in the IBM publication SA22-7095-1 referenced above and will not be redescribed here except for those features that specifically relate to the present invention.

The field at byte locations 100–103 of state description 202 contains a pointer 204 referred to as the system control area origin (SCAO). In a uniprocessing configuration 106, where there are no other guest CPUs 112 in the particular guest machine, SCAO 204 simply contains zero and does not point to anything. In a multiprocessing configuration 106, on the other hand, SCAO 204 points to (more particularly, contains the host real address of) the origin of a system control area (SCA) 206 that is common for all of the guest processors 112 of a particular guest machine 106.

Bits 0–63 of SCA 206 contain the IPTE lock (or IPTE interlock control, as it is also called) 208 of the present invention. Lock 208 contains a lock bit 210 (K) at bit location 0, a 31-bit host count 212 (K_Host) at bit locations 1–31, and a 32-bit guest count 214 (K_Guest) at bit locations 32–63. (The remaining bits are not used.) These various fields function as described below.

State description 202 contains various other controls that are relevant to the present invention. An interception controls (IC) field 216 at byte locations 72–75 of state description 202 contains various bits for triggering instruction interceptions when specified functions are encountered by the guest processor 112. When set to one, the bit IC.7 at bit location 7 of this field causes an instruction interception to recognized whenever an IPTE instruction is encountered by the guest processor. Bit IC.7 also triggers instruction interception for other broadcast instructions, as described further below.

An execution controls (ECA) field 218 at byte locations 76–79 of state description 202 contains various additional bits for controlling execution of the guest processor 112. When set to one, the bit ECA.31 at bit location 31 of this field enables the lock 208 to operate as a shared lock in accordance with the present invention. When ECA.31 is set to zero, the shared lock is disabled and only a single guest CPU 112 can acquire the lock at a time.

IPTE Interlock Control

The IPTE lock 208 will now be described in greater detail.

The hardware, microcode or programming (not separately shown) that implements the present invention will sometimes be referred to as the shared IPTE interlock facility (SIIF). The SIIF is in effect—i.e., the shared IPTE interlock is enabled—when the facility is installed and ECA.31 is one. The SIIF is not in effect when the facility is either not installed, or installed and ECA.31 is zero. When the SIIF is installed, it is installed symmetrically on all CPUs and at both guest level 1 and 2.

K: Bit 0 of the IPTE control is the IPTE interlock control or K bit. A guest broadcast instruction attempts to acquire the IPTE interlock control (as described herein) during execution, and requests release of the IPTE interlock control (as described herein) at the completion of execution.

When the shared IPTE interlock is enabled, extended handling of the K_Host and K_Guest fields of the IPTE interlock control are used to determine whether or not instruction interception is recognized.

K_Host: When the shared IPTE interlock is enabled, bits 1–31 of the IPTE control are a 31-bit unsigned integer that represents a host program algorithm used to manage the number of host program shareholders that currently share ownership of the IPTE interlock control. Alternatively, K_Host may be used to maintain a count of host lock holders. The host program holds the IPTE interlock control when K is one, K_Host is non-zero, and K_Guest is zero. K_Host and K_Guest cannot both simultaneously be non-zero when K is one. K_Host and K_Guest are both zero when K is zero (i.e., the lock is not held).

When the shared IPTE interlock is not enabled, the K_Host field is ignored, and K alone represents the state of the IPTE interlock control. In such a case, it is not possible to determine whether the host program or another interpretively executing CPU holds the lock. Alternatively, when the shared IPTE interlock is not enabled, K_Host may be used as described in the background portion above to define a lock that may be held by either (1) a single guest lock holder on an exclusive basis or (2) one or more host lock holders on a basis that is shared relative to one another but exclusive relative to guest lock holders.

K_Guest: When the shared IPTE interlock is enabled, bits 32-63 of the IPTE control are a 32-bit unsigned integer whose value is a count of the number CPUs of the virtual multiprocessing configuration that are currently in interpretive execution and share ownership of the IPTE interlock control. One or more of the CPUs that each have the same SCA origin value and that are each in the interpretive execution mode holds the IPTE interlock control when K is one, K_Guest is non-zero, and K_Host is zero. K_Guest and K_Host cannot both simultaneously be non-zero when K is one. K_Guest and K_Host are both zero when K is zero (i.e., the lock is not held).

When the shared IPTE interlock is not enabled, the K_Guest field is ignored, and K alone represents the state of the IPTE interlock control. In such a case, it is not possible to determine whether the host program or another interpretively executing CPU holds the lock.

When the shared IPTE interlock is not enabled, the IPTE interlock control consists of the K bit of the IPTE control. Successful acquisition of the IPTE interlock control occurs when an interlocked update function sets K to one. An attempted acquisition fails when K is found to already be one. Release of the IPTE interlock control occurs when an interlocked update function sets K to zero.

When the shared IPTE interlock facility is enabled, the IPTE interlock control consists of the K bit, the 31-bit K_Host field, and the 32-bit K_Guest field of the IPTE control, and is represented as the triplet (K, K_Host, K_Guest), specifying decimal values. Successful acquisition of the IPTE interlock control by a CPU in the interpretive execution mode occurs when an interlocked update count incrementing function is used to acquire the lock in one of the following cases:
1. When the current value is (0, 0, 0), meaning that the lock is not held, an interlocked update to a value of (1, 0, 1) is attempted, indicating K is one (lock held), and the K_Guest count is incremented.
2. When the current value is (1, 0, N) (N>0), meaning that the lock is held by a count of N CPUs in the interpretive execution mode, an interlocked update to a value of (1, 0, N+1) is attempted, indicating K is one (lock held), and the K_Guest count is incremented. If such an interlocked update is successful, the CPUs of a virtual multiprocessing configuration can share the lock while remaining in the interpretive execution mode.

An attempted acquisition fails when the IPTE interlock control is found to have a value (1, N, 0) (N>0).

A request to release the IPTE interlock control by a CPU in the interpretive execution mode occurs when an interlocked update count decrementing function changes the IPTE interlock control represented by one of the following two cases:
1. (1, 0, N) (N>0) is changed to (1, 0, N−1)
2. (1, 0, 1) is changed to (0, 0, 0)

The IPTE interlock control is released only in case 2, as all instances of case 1 merely decrement the count of sharing CPUs.

Successful acquisition of the IPTE interlock control by a host program occurs under any one of the following cases:
1. When the current value is (0, 0, 0), meaning that the lock is not held, an interlocked update to a value of (1, N, 0) (N>0) is attempted indicating K is one (lock held), and the K_Host value is non-zero.
2. When the current value is (1, N, 0) (N>0), meaning that the lock is held by one or more shareholders of the host program, an interlocked update to a value of (1, M, 0) (M>0, M≠N) is attempted, indicating K is one (lock held), and the K_Host field is changed. If such an interlocked update is successful, the one or more shareholders of a host program can share the lock, and the lock cannot be successfully acquired by any CPU in the interpretive execution mode.

An attempted acquisition fails when the IPTE interlock control is found to have a value (1, 0, N) (N>0).

Release of the IPTE interlock control by a host program occurs when an interlocked update function sets the control to (0, 0, 0).

Broadcast Instructions

The following instructions, when executed on a CPU in the interpretive execution mode, may cause a broadcast purge to be signaled:
1. INVALIDATE PAGE TABLE ENTRY (IPTE)
   Broadcast purge signaling is unconditional.
3. COMPARE AND SWAP AND PURGE (CSP)
   Broadcast purge signaling is performed only when purging is specified, and then only when the operand comparison is equal.

An instruction on this list is called a broadcast instruction in this specification. Broadcast purge signaling is conditional according to the particular broadcast instruction, as indicated in the list. Additionally, when signaling is applicable, a broadcast instruction must successfully acquire the IPTE interlock control, otherwise instruction interception is recognized.

The execution of a broadcast instruction is controlled by system control area (SCA) information. The SCA provides a control for coordinating the activities associated with each CPU of a guest multiprocessing configuration. A guest multiprocessing configuration is formed when the same SCAO is specified in the state description of each guest CPU of that configuration. If the SCAO has a value of zero, execution of a guest broadcast instruction does not signal a broadcast purge to real host CPUs, as there are no other CPUs in the virtual configuration.

If the SCAO has a nonzero value, execution of a guest broadcast instruction may signal a broadcast purge to all real CPUs in the host configuration, including the local CPU, to clear guest-type entries that satisfy the appropriate match criterion. For the IPTE instruction, the TLB entries to be cleared are those that are derived from the page table entry designated by the IPTE instruction. For the CSP instruction, a broadcast purge is signaled only if the instruction specifies that a purge is to be performed, as defined in the native architecture. Additionally, a signal may or may not occur when the comparison produces a not-equal result.

Invalidate Page Entry (IPTE)

Execution of an IPTE instruction by the host and the guest is defined below, both for the executing CPU and other CPUs in the configuration.

Figure 3:
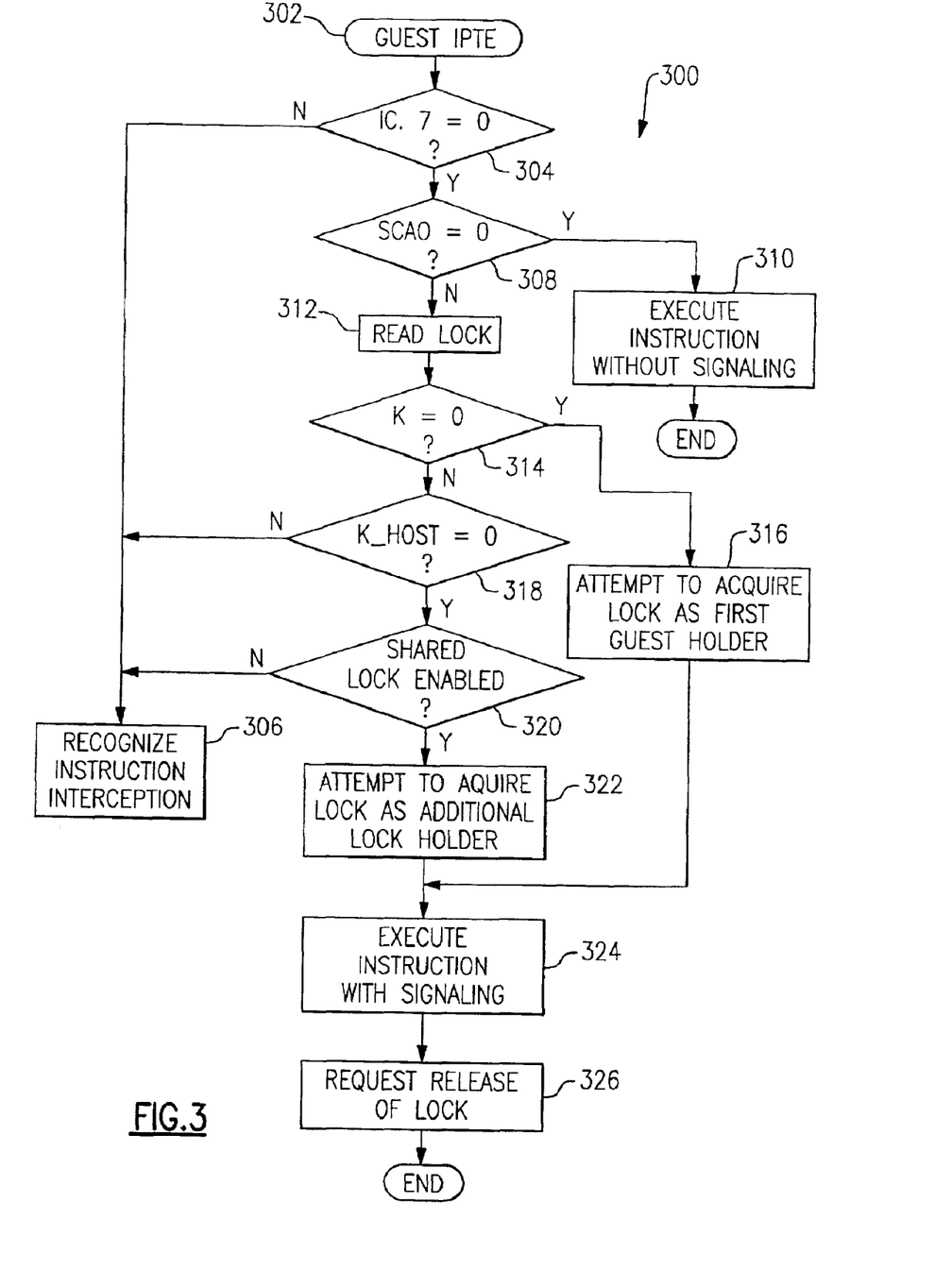
FIG. 3 shows the procedure of the present invention for handling the execution of an Invalidate Page Table Entry (IPTE) instruction on a guest processor.

FIG. 3 (comprising FIGS. 3A–3B) shows the procedure 300 of the present invention for processing an IPTE instruction being executed by a CPU operating in interpretive execution mode (i.e., as a guest processor). Referring also to Table 1 below, upon decoding such an instruction from a guest processor, the procedure determines whether interception control bit 7 (IC.7) is one, indicating that an instruction interception is always recognized when an IPTE instruction is encountered (step 304). If IC.7 is one (Table 1, case 1), instruction interception is recognized (step 306), and execution of the guest IPTE instruction is suppressed.

If IC.7 is zero, then the procedure determines whether SCAO is zero, indicating that the guest processor is the single processor of a guest uniprocessor configuration (step 308). If IC.7 is zero and the SCAO is zero (Table 1, case 3), the IPTE instruction is executed without signaling (step 310). More particularly, the following steps are performed:
1. The invalid bit is set in the guest page table entry specified by the guest IPTE.
2. Any corresponding entry in the TLB of the CPU is cleared, provided that the appropriate match criterion is met.

Broadcast purge, however, is not signaled.

If IC.7 is zero and the SCAO is non-zero, an attempt is made to acquire the IPTE interlock control. This is done by reading the lock (step 312) and determining whether K is zero, indicating that the lock is not being held by any lock holder (step 314). If K is zero (Table 1, case 4), then the procedure attempts to acquire the lock as a first guest holder (step 316); this is done by atomically comparing (K, K_Host, K_Guest) to (0, 0, 0) and changing the triple to (1, 0, 1) if the comparison succeeds.

If K is one, the procedure determines whether K_Host is zero (step 318), indicating that the lock is not being held by a host lock holder. If K_Host is not zero (Table 1, case 2), the attempt fails, and execution of the guest instruction is suppressed and instruction interception is recognized (step

306). If K_Host is zero (Table 1, case 5), and if the shared IPTE lock is not enabled (step 320) the procedure recognizes an instruction interception (step 306). Otherwise, the procedure attempts to acquire the lock as an additional guest holder (step 322); this is done by atomically comparing (K, K_Host, K_Guest) to (1, 0, N), where N is the value of K_Guest when read in step 312, and changing the triple to (1, 0, N+1) if the comparison succeeds. If the comparison at step 316 or 322 fails, the procedure may either fail the attempt right away or make one or more additional attempts to acquire the lock before failing the attempt. If the attempt fails, then an instruction interception is recognized as in step 306, and execution of the guest instruction is suppressed.

If the attempt at step 316 or 322 succeeds, then the IPTE instruction is executed with signaling (step 324). More particularly, the following steps are performed:
1. The invalid bit is set in the guest page table entry specified by the guest IPTE.
2. Any corresponding entry in the TLB of the CPU is cleared, provided that the appropriate match criterion is met.
3. A broadcast purge is signaled to all real CPUs in the host configuration to clear guest-type TLB entries that satisfy the appropriate match criterion.

At the completion of execution, release of the IPTE interlock control is requested (step 326). This is basically the inverse of the acquisition procedure and entails the following. If there are additional guest lock holders—i.e., if (K, K_Host, K_Guest) is (1, 0, N), where N is greater than one—then the triple is changed to (1, 0, N−1) to decrement the number of guest lock holders by one. If the guest processor is the only guest lock holder—i.e., if (K, K_Host, K_Guest) is (1, 0, 1)—then the triple is changed to (0, 0, 0) to indicate that there are no longer any guest lock holders.

For a CPU receiving a broadcast purge signal, any and all guest-type TLB entries that meet the native conditions for clearing and that also meet the appropriate match criterion are cleared. Control of the INVALIDATE PAGE TABLE ENTRY (IPTE) instruction is summarized in Table 1.

TABLE 1

Handling of IPTE

| # | IC.7 Is | SCA Origin Is | K is (No SIIF) | (K, K_Host, K_Guest) is (SIIF) | Handling |
|---|---|---|---|---|---|
| 1 | 1 | x | x | x | II |
| 2 | 0 | N | 1 | (1, N, 0) | II |
| 3 | 0 | 0 | x | x | EN |
| 4 | 0 | N | 0 | (0, 0, 0) | ES |
| 5 | 0 | N | 1 | (1, 0, N) | Not SIIF: II, SIIF: ES |

Explanation:
EN IPTE executed without signaling
ES IPTE executed with signaling
II Instruction interception is recognized
K IPTE-interlock control
N Non-zero value
x The value of the field is ignored, or the check is not performed.
Case number Compare and Swap and Purge (CSP)

Interpretive execution of the COMPARE AND SWAP AND PURGE instruction is defined below, both for the executing CPU and other CPUs in the configuration. Clearing and broadcast purge signaling are performed only when specified according to the native definition (i.e., A, T, or both are one); when neither is specified, neither clearing nor broadcast purge signaling are performed.

Figure 4A:
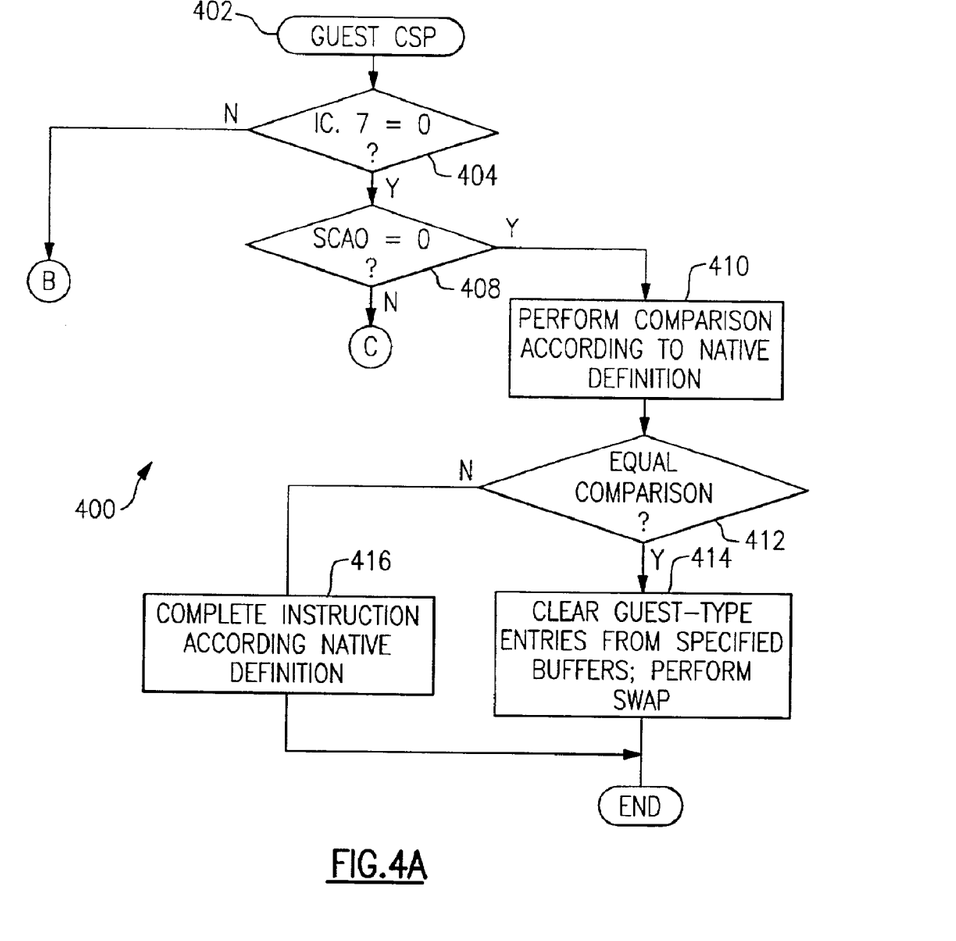
FIG. 4 shows the procedure of the present invention for handling the execution of a Compare and Swap and Purge (CSP) instruction on a guest processor.
Figure 4B:
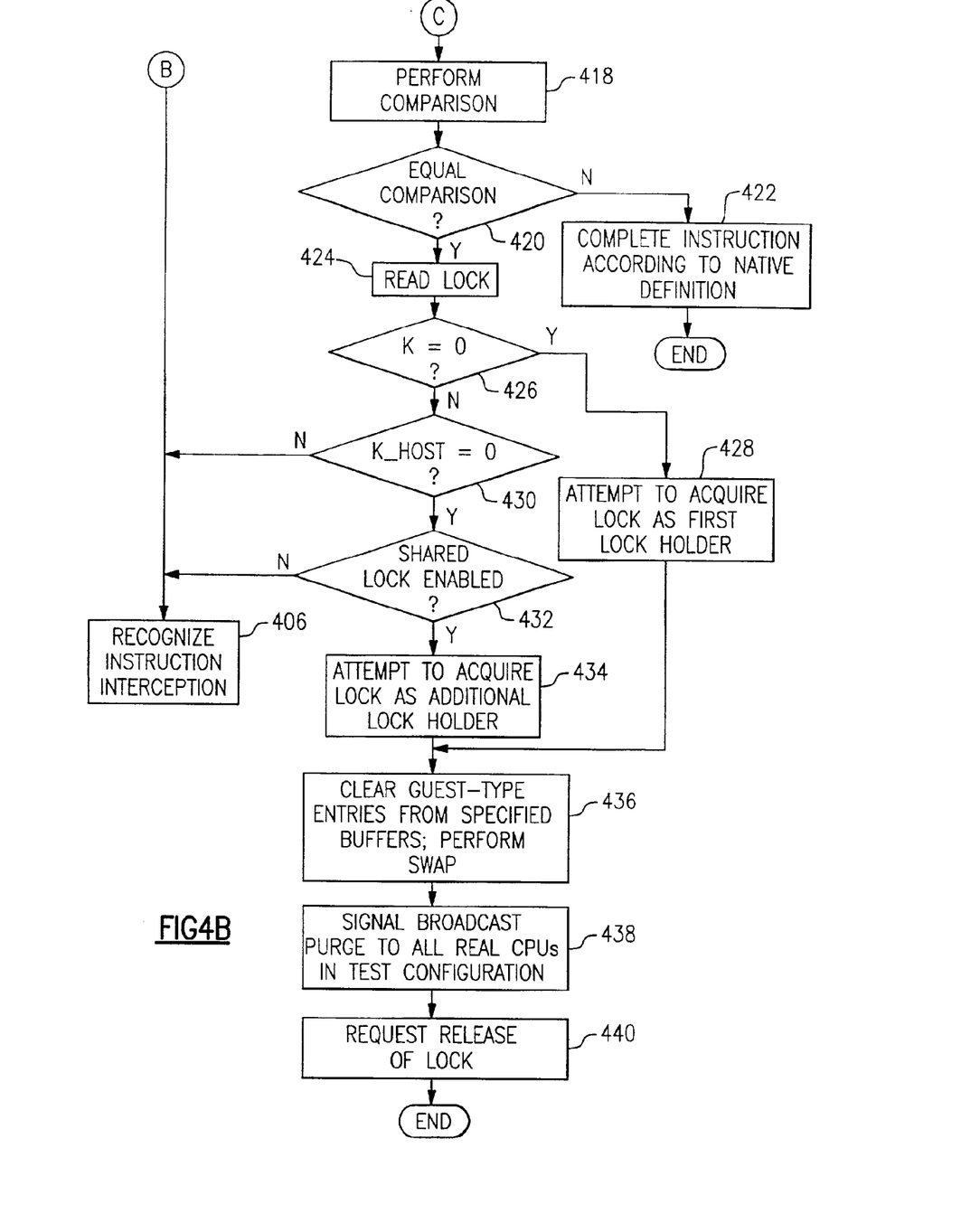

FIG. 4 (comprising FIGS. 4A–4C) shows the procedure 400 of the present invention for processing a CSP instruction being executed by a CPU operating in interpretive execution mode (i.e., as a guest processor). Upon decoding such an instruction from a guest processor (step 402), the procedure determines whether interception control bit 7 (IC.7) is one, indicating that an instruction interception is always recognized when an instruction of this type is encountered (step 404). If IC.7 is one (Table 2, case 1), execution of the guest instruction is suppressed and instruction interception is recognized (step 406).

If IC.7 is zero, then the procedure determines whether SCAO is zero, indicating that the guest processor is the single processor of a guest uniprocessor configuration (step 408). If IC.7 is zero and the SCAO is zero (Table 2, case 4), then the comparison is performed according to the native definition (step 410). If an equal comparison occurs (step 412), the CPU performs the indicated swap and clears guest-type entries from its ALB, TLB, or both, as specified, provided that the appropriate match criterion is met (step 414). When a not-equal comparison occurs, the instruction completes according to the native definition (step 416). Regardless of the comparison result, no broadcast purge is signaled.

In a preferred implementation, if at step 408 the SCAO is non-zero, indicating that the guest processor is one processor of a guest multiprocessing configuration, the comparison is performed (step 418). If a not-equal comparison occurs (step 420), the instruction completes according to the native definition and no broadcast purge signaling is performed (step 422). (This branching corresponds to cases 5–7 in Table 2, which are not differentiated in this implementation of the invention since the lock is never tested.)

If at step 420 an equal comparison occurs, an attempt is made to acquire the IPTE interlock control. This is done by reading the lock (step 424) and determining whether K is zero, indicating that the lock is not being held by any lock holder (step 426). If K is zero (Table 2, case 8), then the procedure attempts to acquire the lock as a first guest holder (step 428); this is done by atomically comparing (K, K_Host, K_Guest) to (0, 0, 0) and changing the triple to (1, 0, 1) if the comparison succeeds.

If K is one (Table 2, case 9), the procedure determines whether K_Host is zero, indicating that the lock is not being held by a host lock holder (step 430). If K_Host is not zero (Table 2, case 3), the attempt fails, and execution of the guest instruction is suppressed and instruction interception is recognized (step 406).

If K_Host is zero, and if the shared IPTE lock is not enabled (step 432) the procedure recognizes an instruction interception (step 406). Otherwise, the procedure attempts to acquire the lock as an additional guest holder (step 434); this is done by atomically comparing (K, K_Host, K_Guest) to (1, 0, N), where N is the value of K_Guest when read in step 424, and changing the triple to (1, 0, N+1) if the comparison succeeds. If the comparison at step 428 or 434 fails, the procedure may either fail the attempt right away or make one or more additional attempts to acquire the lock before failing the attempt. If the attempt fails, execution of the guest instruction is suppressed and instruction interception is recognized (step 406). If the attempt succeeds, and the equal comparison remains true, the following are performed:
a. The CPU performs the indicated swap and clears guest-type entries from its ALB, TLB, or both, as specified, provided that the appropriate match criterion is met (step 436).
b. A broadcast purge is signaled to all real CPUs in the host configuration to clear, as specified, guest-type ALB and TLB entries that satisfy the appropriate match criterion (step 438).

Taken together, the determination of the equal comparison (steps 418–420) and the successful acquisition of the IPTE interlock control (step 424–434) appear as a single interlocked function as observed by all CPUs that are in the interpretive execution mode and that also have the same SCAO value. If the IPTE interlock has been acquired, an IPTE interlock release is requested in the manner described above for the IPTE instruction (step 440) before the instruction completes.

For a CPU receiving a broadcast purge signal, any and all guest-type TLB and ALB entries that meet the native conditions for clearing and that also meet the appropriate match criterion are cleared.

In an alternative implementation, if IC.7 is zero and the SCAO is non-zero, an attempt is made to acquire the IPTE interlock control before performing the comparison. If the attempt fails (generally a Table 2, case 2 situation), execution of the guest instruction is suppressed and instruction interception is recognized. If the attempt succeeds, the comparison is performed according to the native definition. If an equal comparison occurs, the following are performed:
a. The CPU performs the indicated swap and clears guest-type entries from its ALB, TLB, or both, as specified, provided that the appropriate match criterion is met.
b. All real CPUs in the host configuration are signaled to clear, as specified, guest-type ALB and TLB entries that satisfy the appropriate match criterion.

If the IPTE interlock had been acquired, an IPTE interlock release is requested before the instruction completes. This alternative implementation is not a preferred implementation, since it risks an instruction interception for the case of an unequal comparison, where the IPTE lock is not actually needed.

Control of the COMPARE AND SWAP AND PURGE instruction is summarized in Table 2.

TABLE 2

Handling of CSP

| # | IC.7 | SCA Origin | K is (No SIIF) | (K, K_Host, K_Guest) is (SIIF) | Cmpr Result | Handling |
|---|------|------------|----------------|--------------------------------|-------------|----------|
| 1 | 1    | x          | x              | x                              | x           | II       |
| 2 | 0    | N          | 1              | (1, N, 0)                      | x           | II (not preferred, see #3 & #7) |
| 3 | 0    | N          | 1              | (1, N, 0)                      | =           | II (preferred) |
| 4 | 0    | 0          | x              | x                              | x           | EN       |
| 5 | 0    | N          | 0              | (0, 0, 0)                      | ≠           | EN       |
| 6 | 0    | N          | 1              | (1, 0, N)                      | ≠           | EN (preferred) |
| 7 | 0    | N          | 1              | (1, N, 0)                      | ≠           | EN (preferred) |
| 8 | 0    | N          | 0              | (0, 0, 0)                      | =           | ES       |
| 9 | 0    | N          | 1              | (1, 0, N)                      | =           | Not SIIF: II, SIIF: ES |

Explanation:
EN CSP executed without signaling
ES CSP executed with signaling
II Instruction interception is recognized
K IPTE-interlock control
N Non-zero value
x The value of the field is ignored, or the check is not performed.
= CSP operands are equal
≠ CSP operands are not equal
Case number While a particular embodiment has been shown and described, various modifications will be apparent to those skilled in the art.

What is claimed is:

1. In an information handling system containing a plurality of processors, each of which is operable either as a host processor under the control of a host program executing on a host machine or as a guest processor under the control of a guest program executing on a guest machine, the guest machine being defined by the host program executing on the host machine and containing a plurality of such guest processors, a method for managing the execution on one of the guest processors of a broadcast instruction requiring a corresponding operation on other processors of the guest machine, the method comprising the steps of:

defining for the guest machine a lock containing an indication of whether it is being held by a host lock holder from the host program and a count of the number of processors holding the lock as guest lock holders;

upon decoding a broadcast instruction executing on a processor operating as a guest processor, testing the lock to determine whether it is being held by a host lock holder;

if the lock is being held by a host lock holder, terminating execution of the instruction; and if the lock is not being held by a host lock holder, updating the lock to indicate that it is being held by the guest processor as a shared lock holder and executing the instruction.

2. The method of claim 1 in which the lock contains an indicator that is set to a first value to indicate that it is not being held by either a host lock holder or a guest lock holder and is set a second value to indicate that it is being held by at least one host lock holder or at least one guest lock holder, the step of updating the lock to indicate that it is being held by the processor as a guest lock holder comprising the step of setting the indicator to the second value.

3. The method of claim 1 in which the lock contains a host count that is set to zero to indicate that it is not being held by a host lock holder and is set to a nonzero value to indicate that it is being held by at least one host lock holder, the step of testing the lock to determine whether it is being held by a host lock holder comprising the step of testing the host count to determine whether it is zero.

4. The method of claim 1 in which the lock contains a guest count indicating the number of processors holding the lock as guest lock holders, the step of updating the lock to indicate that it is being held by the processor as a guest lock holder comprising the step of incrementing the guest count.

5. The method of claim 1, comprising the step of updating the lock a second time after the instruction is executed to indicate that it is no longer being held by the guest processor as a shared lock holder.

6. The method of claim 5 in which the lock contains a guest count indicating the number of processors holding the lock as guest lock holders, the step of updating the lock a second time to indicate that it is being held by the processor as a guest lock holder comprising the step of decrementing the guest count.

7. In an information handling system containing a plurality of processors, each of which is operable either as a host processor under the control of a host program executing on a host machine or as a guest processor under the control of a guest program executing on a guest machine, the guest machine being defined by the host program executing on the host machine and containing a plurality of such guest processors, apparatus for managing the execution on one of the guest processors of a broadcast instruction requiring a corresponding operation on other processors of the guest machine, comprising:

means for defining for the guest machine a lock containing an indication of whether it is being held by a host lock holder from the host program and a count of the number of processors holding the lock as guest lock holders;

means for testing the lock to determine whether it is being held by a host lock holder upon decoding a broadcast instruction executing on a processor operating as a guest processor;

means for terminating execution of the instruction if the lock is being held by a host lock holder; and means for updating the lock to indicate that it is being held by the guest processor as a shared lock holder and executing the instruction if the lock is not being held by a host lock holder.

8. The apparatus of claim 7 in which the lock contains an indicator that is set to a first value to indicate that it is not being held by either a host lock holder or a guest lock holder and is set to a second value to indicate that it is being held by at least one host lock holder or at least one guest lock holder, the means for of updating the lock to indicate that it is being held by the processor as a guest lock holder comprising means for setting the indicator to the second value.

9. The apparatus of claim 7 in which the lock contains a host count that is set to zero to indicate that it is not being held by a host lock holder and is set to a nonzero value to indicate that it is being held by at least one host lock holder, the means for testing the lock to determine whether it is being held by a host lock holder comprising means for testing the host count to determine whether it is zero.

10. The apparatus of claim 7 in which the lock contains a guest count indicating the number of processors holding the lock as guest lock holders, the step of updating the lock to indicate that it is being held by the processor as a guest lock holder comprising the step of incrementing the guest count.

11. The apparatus of claim 7, comprising means for updating the lock a second time after the instruction is executed to indicate that it is no longer being held by the guest processor as a shared lock holder.

12. The apparatus of claim 11 in which the lock contains a guest count indicating the number of processors holding the lock as guest lock holders, the means for updating the lock a second time to indicate that it is being held by the processor as a guest lock holder comprising means for decrementing the guest count.

13. A program storage device readable by a machine, tangibly embodying a program of instructions executable by the machine to perform method steps for managing the execution on a guest processor of a broadcast instruction requiring a corresponding operation on other processors of a guest machine in an information handling system containing a plurality of processors, each of which is operable either as a host processor under the control of a host program executing on a host machine or as a guest processor under the control of a guest program executing on a guest machine, the guest machine being defined by the host program executing on the host machine and containing a plurality of such guest processors, the method steps comprising:

defining for the guest machine a lock containing an indication of whether it is being held by a host lock holder from the host program and a count of the number of processors holding the lock as guest lock holders;

upon decoding a broadcast instruction executing on a processor operating as a guest processor, testing the lock to determine whether it is being held by a host lock holder;

if the lock is being held by a host lock holder, terminating execution of the instruction; and if the lock is not being held by a host lock holder, updating the lock to indicate that it is being held by the guest processor as a shared lock holder and executing the instruction.

14. The program storage device of claim 13 in which the lock contains an indicator that is set to a first value to indicate that it is not being held by either a host lock holder or a guest lock holder and is set to a second value to indicate that it is being held by at least one host lock holder or at least one guest lock holder, the step of updating the lock to indicate that it is being held by the processor as a guest lock holder comprising the step of setting the indicator to the second value.

15. The program storage device of claim 13 in which the lock contains a host count that is set to zero to indicate that it is not being held by a host lock holder and is set to a nonzero value to indicate that it is being held by at least one host lock holder, the step of testing the lock to determine whether it is being held by a host lock holder comprising the step of testing the host count to determine whether it is zero.

16. The program storage device of claim 13 in which the lock contains a guest count indicating the number of processors holding the lock as guest lock holders, the step of updating the lock to indicate that it is being held by the processor as a guest lock holder comprising the step of incrementing the guest count.

17. The program storage device of claim 13, the method steps comprising the step of updating the lock a second time after the instruction is executed to indicate that it is no longer being held by the guest processor as a shared lock holder.

18. The program storage device of claim 17 in which the lock contains a guest count indicating the number of processors holding the lock as guest lock holders, the step of updating the lock a second time to indicate that it is being held by the processor as a guest lock holder comprising the step of decrementing the guest count.

19. In an information handling system, a method for managing a lock comprising the steps of:

defining a lock containing a first count of the number of requesters from a first group holding the lock on a shared basis and a second count of the number of requesters from a second group holding the lock on a basis that is shared among requesters of the second group but exclusive relative to requesters of the first group;

upon receiving a request for said lock from one of said groups, testing the lock to determine whether it is being held by any requesters from the other group;

if the lock is being held by any requesters from the other group, denying the request; and if the lock is not being held by any requesters from the other group, granting the request and updating the lock to indicate that it is being held by the requester as a shared lock holder.

20. The method of claim 19 in which the lock contains an indicator that is set to a first value to indicate that it is not being held by a lock holder from either of said groups and is set to a second value to indicate that it is being held by at least one lock holder from one of said groups, the step of updating the lock to indicate that it is being held by the requester as a shared lock holder comprising the step of setting the indicator to the second value if it is not already set to the second value.

21. The method of claim 19 in which the step of testing the lock to determine whether it is being held by any requesters from the other group comprises the step of testing the count associated with the other group to determine whether it is zero.

22. The method of claim 19 in which the step of updating the lock to indicate that it is being held by the requester as a shared lock holder comprises the step of incrementing the count associated with said one of said groups.

23. In an information handling system, apparatus for managing a lock, comprising:

means for defining a lock containing a first count of the number of requesters from a first group holding the lock on a shared basis and a second count of the number of requesters from a second group holding the lock on a basis that is shared among requesters of the second group but exclusive relative to requesters of the first group;

means responsive to receiving a request for said lock from one of said groups for testing the lock to determine whether it is being held by any requesters from the other group;

means for denying the request if the lock is being held by any requesters from the other group; and means for granting the request and updating the lock to indicate that it is being held by the requester as a shared lock holder if the lock is not being held by any requesters from the other group.

24. A program storage device readable by a machine, tangibly embodying a program of instructions executable by the machine to perform method steps for managing a lock, the method steps comprising:

defining a lock containing a first count of the number of requesters from a first group holding the lock on a shared basis and a second count of the number of requesters from a second group holding the lock on a basis that is shared among requesters of the second group but exclusive relative to requesters of the first group;

upon receiving a request for said lock from one of said groups, testing the lock to determine whether it is being held by any requesters from the other group;

if the lock is being held by any requesters from the other group, denying the request; and if the lock is not being held by any requesters from the other group, granting the request and updating the lock to indicate that it is being held by the requester as a shared lock holder.

* * * * *